Aug. 14, 1934.                F. O. CARLSON                1,969,725
                        PISTON PIN INSERTER AND REMOVER
                            Filed Dec. 11, 1931
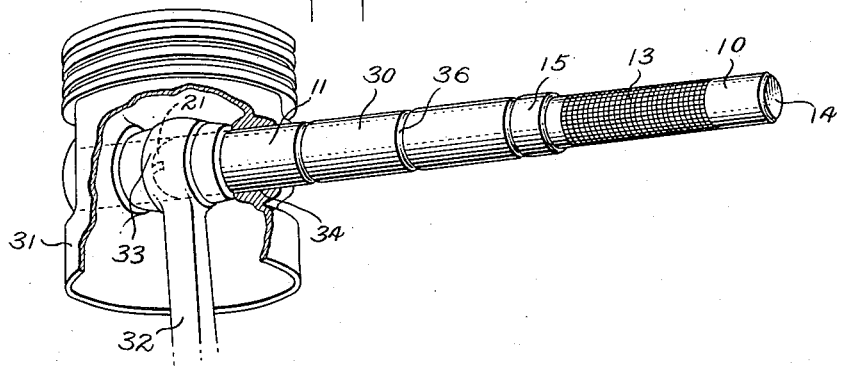
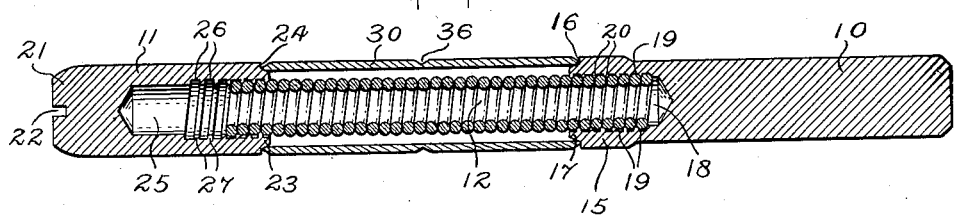
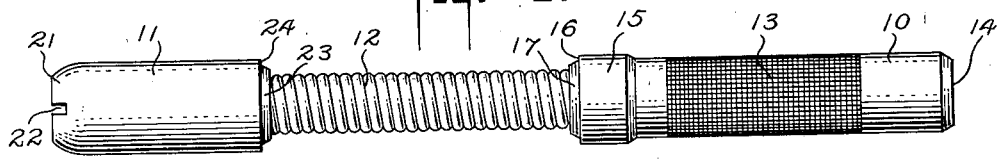
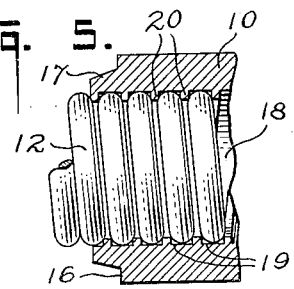
INVENTOR
Frederich O. Carlson
BY
Janney, Blair & Curtis
ATTORNEYS Patented Aug. 14, 1934

1,969,725

UNITED STATES PATENT OFFICE 1,969,725

PISTON PIN INSERTER AND REMOVER

Frederick O. Carlson, Shelburne Falls, Mass., assignor to Mayhew Steel Products, Inc., Shelburne Falls, Mass., a corporation of Delaware Application December 11, 1931, Serial No. 580,261

11 Claims. (Cl. 29—88.2)

The invention relates to tools for inserting and removing piston pins.

An object of the invention is to provide an efficient and dependable tool of the class indicated. Another object of the invention is to provide a tool which will withstand extremely hard usage. Another object of the invention is to provide a tool by means of which an inserting or removing operation may be quickly effected. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing, in which is shown one of various possible embodiments of the mechanical features of this invention, Figure 1 is a side elevational of a tool constructed in accordance with the invention;

Figure 2 is an axial sectional view of the tool showing also in section the piston pin held thereby;

Figure 3 is an elevation of a retaining ring for a piston pin;

Figure 4 is a perspective view showing a piston and connecting rod having a piston pin inserted therein by the tool; and Figure 5 is an enlarged cross sectional view of a portion of the tool.

Referring first to Figure 1, in a preferred embodiment of the invention, the tool comprises a handle or anvil 10 and a head 11 connected by a spring screw 12. Referring to the right-hand side of Figure 1, the handle 10 is generally cylindrical in form and has a knurled portion 13 to facilitate the gripping thereof and a flat end 14 to receive blows from a hammer. Still referring to Figure 1, at the left-hand end of the handle 10 is an enlarged diameter portion 15 which defines a shoulder 16 beyond which is a centering flange 17.

Referring now to the right-hand side of Figure 2, extending a short distance into the handle 10 from the end thereof which has the centering flange 17 is an axial bore 18. In this bore 18 is formed a spiral groove 19. The spring 12 has the same pitch as the spiral groove 19 and, as shown in Figure 2, fits therein as a screw in a threaded bore, the shape of the spiral groove 19 being preferably somewhat different from the ordinary screw thread in order that it may receive and hold the spirals of the spring 12. Figure 5 shows in enlarged view the spiral 19 and a thread 20 defined thereby, with a portion of the spring 12 therein.

Referring now to the left-hand side of Figure 1, the head 11 has a tapered or rounded nose portion 21 having a screw slot 22 therein. The head 11 is generally cylindrical, there being however at the right-hand end of the head 11 a centering flange 23 bounded by a shoulder 24.

Referring now to the left-hand portion of Figure 2, extending from the end of the head 11 having the centering flange 23 a considerable distance into the head 11 is an axial bore 25 into which extends for a limited distance a spiral groove 26 of the same pitch and shape as the spiral groove 19 and defining a thread 27 similar to the thread 20.

Referring now to Figure 2 in connection with Figure 4, when it is desired to insert a piston or wrist pin or tubular element 30 into a cylinder 31 and connecting rod 32, the spring 12 is first screwed into the spiral groove 19 in the handle 10 or into the spiral groove 26 in the head 11, and the piston pin 30 is placed over the spring 12 and over either the flange 17 or the flange 23. The projecting end of the spring 12 is then screwed into the remaining spiral groove 19 or 26, as the case may be, in the handle 10 or the head 11, and the handle 10 and head 11 are then brought together by turning one of the parts 10 or 11 with respect to the other until the spring 12 has advanced into both spiral grooves 19 and 26 and been appreciably elongated and so placed under considerable tension. This action locates the piston pin 30 between the handle 10 and the head 11 (with the piston pin over the flanges 17 and 23 and against the shoulders 16 and 24) and holds the head 11 tightly but resiliently against the handle 10 so that any axial blow imparted to the handle on the face 14 is transferred to the head 11 through the medium of the pin 30— this action occurring independently of the spring 12 and also independently of an exact axial alignment of the tool. This manner of holding the head 11 and the handle 10 tightly against the respective ends of the pin 30 also tends to prevent the head 11 from unscrewing from the spring 12 because of the frictional resistance afforded by the pin 30 and by the thread connection itself. Thus, even though the head 11 is unscrewed with respect to the spring 12 for a turn or so (for one reason or another) during the insertion of the pin, it is still held tightly in contact with the pin by the still "tensioned" spring. In screwing the parts of the tool together the handle 10 may be held in a vise and a screw-driver and brace used to turn the head 11 to place the spring 12 under considerable tension. Figure 2 shows the parts with the spring 12 advanced into the spiral groove 26 before it is placed under tension, which tension spreads the coils of the spring between the handle and the head of the tool.

Assuming now that the bore in the wrist 33 of the connecting rod 32 has been approximately aligned with the bore 34 in the walls of the piston 31, and that the retaining ring 35 (see Figure 3) has been located in the groove, not shown, provided for it inside of the wrist 33, the piston pin 30 may be inserted in the manner shown in Figure 4. The head 11 of the tool is placed in the bore 34 and entered into the bore in the wrist 33. The tapered or rounded nose portion 21 acts to automatically align the wrist 33 with the piston 31, and when the nose 21 reaches the retaining ring 35 it expands it into its groove in the connecting rod bushing. In order to drive the piston pin 30 into the bore 34 and into the connecting rod bushing, a hammer may be used to drive the tool, striking the end 14 of the handle 10. By reason of the fact that the head 11 is connected to the handle 10 through the medium of the spring 12, the tool is very flexible, which makes it possible to drive the piston pin 30 into place very readily. The flexible spring connection between the two parts of the tool insures that at all times the blows imparted to the handle 10 will be transmitted to the pin 30 and through the medium of the pin 30 to the head 11 and that the spring 12 and the threaded connections between the spring 12 and the handle 10 and the head 11 respectively can at no time take the brunt of the blow. Further, with this spring connection, if during the process of the insertion of the pin, the handle 10 is moved out of axial alignment with the head 11, no injury is done to the tool, or to the pin, and the moment the force moving the handle 10 out of the axial alignment is removed, the handle is again centered with respect to the rest of the tool.

Practical demonstration has shown that, when the pilot of a piston pin inserter or head is attached to the driving handle by a rigid stem and threaded connections, there is a tendency for the head or pilot to loosen or unthread with respect to the stem, thereby becoming displaced with respect to the pin so that the rigid stem (and of course the threads connecting the stem and the head) bear the brunt of the blow. This action tends to harm the tool by either stripping the threads and bending the stem or in other ways damaging it. It is also believed that when a blow is imparted to the handle 10 of such a tool and is transferred to the head 11 through the pin 30, a certain compression is created in the pin which, when the pressure of the blow is relieved, reacts to move the handle 10 backwards, and that, when a rigid stem is employed, the effect of this reaction is ultimately to strip the threads at either the handle 10 or at the head 11. However, these difficulties are overcome with the present construction, for as hereinbefore pointed out, even though the head 11 does unscrew with respect to the spring 12, there is sufficient leeway (because of the expanded spring) to insure at all stages a tight connection between the head 11, the pin 30 and the handle 10. Further, with my improved construction, even if the head 11 does become so loosened with respect to the rest of the tool as no longer to hold in tight contact with the pin 30, still no injury can be done to the tool through blows imparted to the handle 10 because of the inherent nature of the spring 12.

Furthermore, as hereinbefore described, no injury is done to the tool if the handle 10 is moved out of axial alignment with the head 11 as by a glancing blow or the like, because of the flexible and resilient character of the spring 12, whereas if the spring 12 were rigid as in the present known piston pin inserters, such a happening would damage the tool by permanently bending the stem, thereby throwing the tool permanently out of axial alignment. It is thus seen that my improved construction prevents breakage of the tool. Furthermore the spring 12 draws the handle 10 and the head 11 towards each other preventing opening between the parts of the tool and the piston pin and the slipping into such opening of the retaining ring 35, which has happened frequently in connection with certain prior constructions. When the piston pin 30 comes to the exact desired position, the retaining ring 35, which was expanded by the nose 21 as described, drops into the groove 36 provided for it in the piston pin 30, and the piston pin 30 is then properly located in place. The head 11 may then be unscrewed from the spring 12 and the base of the tool withdrawn.

When it is desired to remove a piston pin 30 the handle 10 may be used as a punch.

It will thus be seen that there has been provided by this invention an article in which the various objects hereinabove set forth, together with many practical advantages, are successfully achieved.

As various possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. A tool for holding and inserting a tubular element in a bore, including in combination, a handle, a head, a spring connecting said handle and said head, and a tapered nose portion on said head.

2. A tool for holding and inserting a tubular element in a bore, including in combination, a handle, a head, a tapered nose on said head, and resilient flexible means connecting said handle and said head.

3. A tool for holding and inserting a tubular element in a bore, including in combination, a handle, a head, a tapered nose on said head, extendible resilient means connecting said handle and said head, and a screw slot in one of said parts.

4. A tool for inserting wrist pins in the coacting bores of a piston and its connecting rod, comprising in combination, a generally cylindrical handle having a screw threaded bore at one end, a generally cylindrical head portion having a screw threaded bore at one end, a closed coil spring of a size to fit in said bores, the pitch of the coils of the spring being the same as the pitch of the threads in said bores, said coil spring removably connecting said handle and said head, and shoulder portions on said handle and said head for the reception of a piston pin.

5. A tool for inserting a wrist pin for joining a piston and its respective connecting rod, a handle having a blow receiving end and an end having a threaded bore, a head having a tapered guiding end and an end having a threaded bore, and a coil spring having ends for respective movable threading into said respective threaded bores; said handle, spring and head coacting to support a wrist pin, said wrist pin being held tightly and resiliently between said handle and head by the tension of said coil spring, whereby blows imparted to the blow receiving portion of said handle during the insertion of said wrist pin are transmitted directly to said wrist pin and are transmitted to said head through the medium of said wrist pin.

6. A tubular element in substantially aligned bores of two or more members, comprising a handle having a blow receiving portion and a tubular element supporting portion, a head having a tapered guiding portion and a tubular element supporting portion, the tubular element supporting portion of said handle and head being capable of supporting the respective ends of a tubular element, and resilient flexible means for holding said handle and head tightly, resiliently and flexibly against the respective ends of said tubular element whereby blows imparted to said handle during the insertion of said tubular element in bores is imparted to said tubular element and through said tubular element to said head.

7. A driving tool comprising a head member, an anvil member releasably connected to said head member and spaced therefrom to hold an element in operative position to be driven by the driving tool, and resilient means operatively arranged to absorb reactive forces operating on said members after a driving blow is struck on said anvil member and transmitted thereby to said element.

8. A driving tool comprising a head member, an anvil member releasably connected to said head member and spaced therefrom to hold an element in operative position to be driven by the driving tool, and further characterized in that means are provided whereby, when a driving blow is struck on the anvil effecting compression of the element, the reacting forces incident thereto are cushioned between said element and one of said members.

9. A tool for driving an element into position with another element comprising, in combination, a head member, a rear driving member, said respective members being adapted to hold therebetween an element to be driven, whereby driving blows delivered to said driving member are transmitted to said driven element and by said driven element to said head member, and resilient means for connecting said members to retain the driven element in position between said members.

10. A tool for driving an element into position with another element comprising, in combination, a head member, a rear driving member, said respective members being adapted to hold therebetween an element to be driven, whereby driving blows delivered to said driving member are transmitted to said driven element and by said driven element to said head member, and spring means for connecting said members, to retain the driven element in position between said members, whereby any reaction of said driving member from said head member caused by the expansion of said driven element compressed by a blow is absorbed by said resilient connecting means.

11. A driving tool including an anvil member, a head member, said members being adapted to support therebetween an element to be driven, and a spring threadably engaging said members for resiliently connecting them to hold the driven element in position between said members.

FREDERICK O. CARLSON.